No. 787,366. PATENTED APR. 18, 1905.
A. L. FRENCH.
STEAM TRAP.
APPLICATION FILED JAN. 20, 1904.

Witnesses:
Edwin T. Luce
Frank A. Smith

Inventor:
Alton L. French,
by Walter E. Lombard
Atty.

No. 787,366.

Patented April 18, 1905.

UNITED STATES PATENT OFFICE.

ALTON L. FRENCH, OF BROCKTON, MASSACHUSETTS.

STEAM-TRAP.

SPECIFICATION forming part of Letters Patent No. 787,366, dated April 18, 1905.

Application filed January 20, 1904. Serial No. 189,808.

*To all whom it may concern:*

Be it known that I, ALTON L. FRENCH, a citizen of the United States of America, and a resident of Brockton, in the county of Plymouth and State of Massachusetts, have invented certain new and useful Improvements in Steam-Traps, of which the following is a specification.

This invention relates to steam-traps, and particularly to that class of traps which have a float working in the water of condensation to actuate the discharge-regulating valve; and it consists in providing a steam-trap with two water seals for the more effective operation of the trap; and it also consists in providing a sediment-chamber in which the sediment conveyed to the trap from the steam-inlet will be collected and prevented from passing into the float-chamber to prevent the operation of the valve.

It further consists in certain novel features of construction and arrangement of parts, which will be readily understood by reference to the description of the drawings and to the claims to be hereinafter given.

Figure 1:
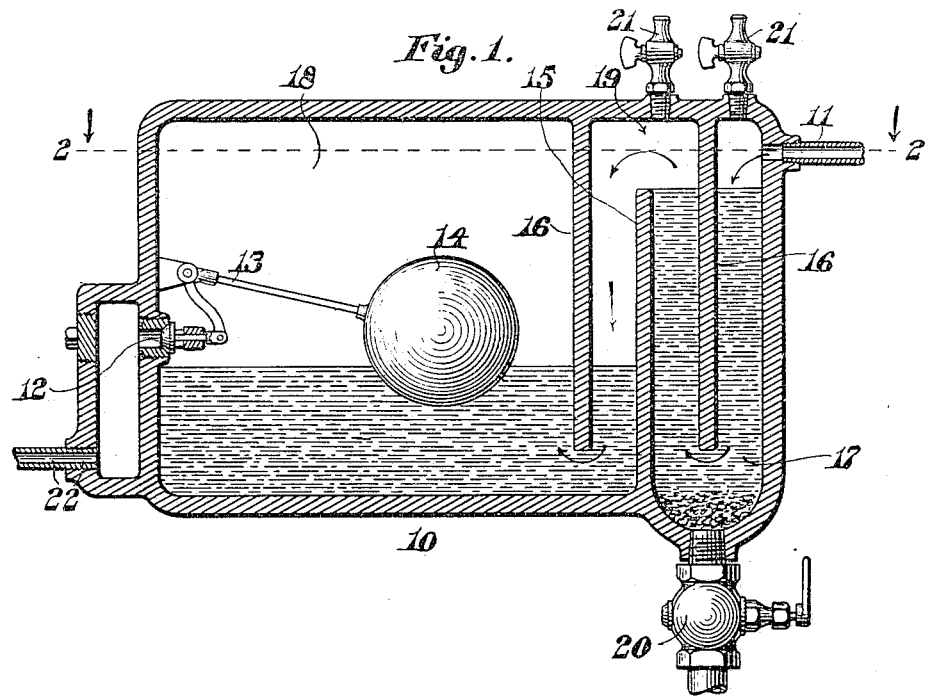
Figure 2:
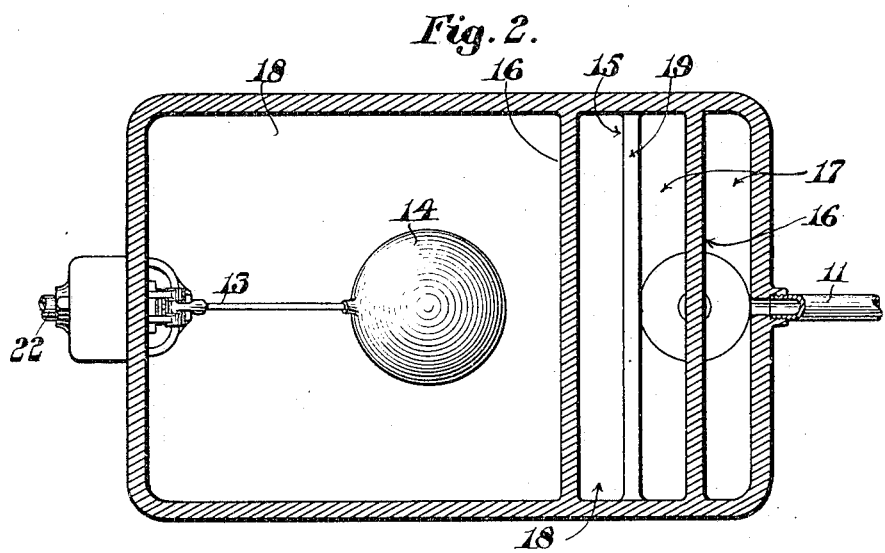

Of the drawings, Figure 1 represents a sectional elevation of the steam-trap embodying this invention, and Fig. 2 represents a sectional plan of the same, the cutting plane being on line 2 2 on Fig. 1.

Similar characters designate like parts throughout both figures of the drawings.

In the drawings, 10 represents a casing of a trap to which steam enters through an inlet 11. An outlet-valve 12 is provided in the opposite end of the trap, said valve being operated by a bell-crank lever 13, having secured to its longer arm a float 14, which is raised and lowered by the water condensed within said trap to operate the valve 12 to open and close the same, as desired.

From the bottom of the casing 10, near the inlet end, extends upward a partition 15, reaching nearly to the top of said casing. On either side of the partition 15 partitions 16 extend from the top of the trap nearly to its bottom. The partition 15 divides the trap into two chambers—a sediment-chamber 17 and a float-chamber 18—these chambers 17 18 communicating at the top at 19. These chambers 17 18 are again divided by the partitions 16, extending nearly to the bottom of said chambers, and in said chambers water is maintained to a level higher than the communicating passages in said partitions 16. This necessitates the steam entering from the inlet 11, passing downward in the chamber 17, around the partition 16, upward and through the passage 19, into the chamber 18, where it again passes downward and around the partition 16 into the larger part of the chamber 18, in which the float 14 operates to open and close the valve 12.

The steam in passing through the chambers 17 18, around the partition 16, is obliged to twice pass through the water maintained in said trap, thereby making its operation much more effective. The bottom of the sediment-chamber 17 is provided with a valve 20, through which the sediment collected in said chamber is permitted to be drained off.

Heretofore in steam-traps the sediment is permitted to pass throughout the trap and often gets into the valve 12, preventing its effective operation and sometimes cuts the valve-seat to such an extent as to make it useless. This is entirely obviated by the partition 15, which prevents any sediment from passing into the float-chamber 18 and interfering with the proper operation of the valve 12.

Air-cocks 21 are mounted in the upper side of the casing 10 and communicate with the chambers between the partitions 15 16 16 and the steam-inlet, permitting the exit of air from these chambers to prevent any undue resistance thereby.

By this invention a trap is produced which is very effective in operation owing to its two water seals and on account of its separate sediment-chamber is less liable to get out of order than traps now in general use.

Having thus described my invention, I claim—

1. In a steam-trap, the combination of two partitions extending from the top nearly to the bottom, an intermediate partition extending from the bottom nearly to the top thereof, a steam-inlet, an outlet-valve, and a float for operating said valve.

2. In a steam-trap, the combination of two partitions extending from the top and provided with an opening at the bottom ends, an intermediate partition extending from the bottom and provided with an opening at its upper end, an inlet-opening, an outlet-opening, a valve closing one of the openings, and a float for operating said valve.

3. In a steam-trap, the combination of four chambers two pairs of which communicate at one end and each pair communicating with the other at the opposite end, an outlet-valve, a float for operating said valve, and a steam-inlet communicating with the closed end of the chamber most removed from said outlet-valve.

4. In a steam-trap, the combination of two partitions extending from the top nearly to the bottom, an intermediate partition extending from the bottom nearly to the top and forming thereby four communicating chambers, a steam-inlet communicating with the closed end of an outer chamber, an outlet-valve, and a float to operate said valve.

5. In a steam-trap, the combination of two partitions extending from the top nearly to the bottom, an intermediate partition extending from the bottom nearly to the top and forming thereby four communicating chambers, a steam-inlet communicating with the closed end of an outer chamber, and an air-cock communicating with the closed end of a chamber between said partitions.

6. In a steam-trap, the combination of two partitions extending from the top nearly to the bottom, an intermediate partition extending from the bottom nearly to the top and forming thereby four communicating chambers, a steam-inlet communicating with the closed end of an outer chamber, an outlet-valve from the opposite chamber, and a pivoted float for operating said valve.

7. In a steam-trap, the combination with a steam-inlet, an outlet-valve and a float to operate said valve, of two water seals intermediate said inlet and outlet.

8. In a steam-trap, the combination of two chambers communicating at the top, a partition extending from the top nearly to the bottom of each of said chambers, a steam-inlet communicating with the closed end of one of said chambers, an outlet-valve in the other chamber and a float for operating said valve.

9. In a steam-trap, the combination of an outlet-valve, a float for operating said valve, a steam-inlet, a sediment-chamber at the inlet end, a valve-chamber at the outlet end, and a partition between said sediment-chamber and said valve-chamber.

10. In a steam-trap, the combination of an outlet-valve, a float for operating said valve, a steam-inlet, a sediment-chamber at the inlet end, a valve-chamber at the outlet end, a partition between said sediment-chamber and valve-chamber, and means for drawing off the sediment from said chamber.

11. In a steam-trap, the combination of a partition dividing said trap into two chambers communicating at the top, a steam-inlet communicating with one of said chambers, a partition extending downwardly into the inlet-chamber, an outlet-valve, and a float for operating said valve.

12. In a steam-trap, the combination of a partition extending from the top and dividing said trap into two chambers communicating at the bottom, a steam-inlet communicating with one of said chambers, and a partition extending from the bottom nearly to the top of said inlet-chamber and outlet-valve, and a float for operating said valve.

13. In a steam-trap, the combination of two partitions, a plurality of chambers containing water separated by a partition extending upwardly from the bottom thereof, an outlet-valve, a float for operating said valve, and a steam-inlet so situated that the steam from the latter will pass to said outlet through said chambers and the water therein contained.

14. In a steam-trap, the combination of four chambers, two pairs of which communicate at one end and each pair communicating with the other at the opposite end, an outlet-valve, a float for operating said valve, and a steam-inlet communicating with one of the chambers removed from said outlet-valve.

15. In a steam-trap, the combination of four chambers, two pairs of which communicate at one end and each pair communicating with the other at the opposite end, an outlet-valve, a float for operating said valve, and a steam-inlet so situated that the steam therefrom passing to the outlet-valve will pass through all four chambers.

16. In a steam-trap, the combination of an outlet-valve, a float for operating said valve, a steam-inlet, a water-seal chamber located adjacent to said steam-inlet, and a second water seal interposed between said chamber and said outlet-valve.

Signed by me at Boston, Massachusetts, this 11th day of January, 1904.

ALTON L. FRENCH.

Witnesses:
    WALTER E. LOMBARD,
    MARSHALL UNDERWOOD.